US011738629B2

(12) United States Patent
Yu et al.

(10) Patent No.: US 11,738,629 B2
(45) Date of Patent: Aug. 29, 2023

(54) VEHICLE TWO-POWER-SOURCE DUAL DRIVING ASSEMBLY

(71) Applicant: Jing-Jin Electric Technologies Co., Ltd., Beijing (CN)

(72) Inventors: Ping Yu, Beijing (CN); Jianwen Li, Beijing (CN); Yongwu Wang, Beijing (CN); Zhe Jiang, Beijing (CN)

(73) Assignee: JING-JIN ELECTRIC TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 15/767,592

(22) PCT Filed: Sep. 8, 2017

(86) PCT No.: PCT/CN2017/101046
§ 371 (c)(1),
(2) Date: Apr. 11, 2018

(87) PCT Pub. No.: WO2019/019292
PCT Pub. Date: Jan. 31, 2019

(65) Prior Publication Data
US 2020/0238807 A1    Jul. 30, 2020

(30) Foreign Application Priority Data

Jul. 27, 2017   (CN) .......................... 201710624209.9

(51) Int. Cl.
*B60K 1/02* (2006.01)
*B60K 17/02* (2006.01)
(Continued)

(52) U.S. Cl.
CPC .............. *B60K 1/02* (2013.01); *B60K 7/0007* (2013.01); *B60K 17/02* (2013.01); *B60K 17/043* (2013.01);
(Continued)

(58) Field of Classification Search
CPC ................... B60K 1/02; B60K 7/0007; B60K 2007/0061; B60K 17/02; B60K 17/043;
(Continued)

(56) References Cited

U.S. PATENT DOCUMENTS 1,257,830 A  *  2/1918  Evensen ................... F16H 3/08
                                                  74/357
2,220,463 A  *  11/1940 Sinclair ................... F16D 23/04
                                                  192/69.83
(Continued)

FOREIGN PATENT DOCUMENTS

CN          102133854 A      7/2011
CN          102133855 A      7/2011
(Continued)

OTHER PUBLICATIONS

International Search Report entered in PCT/CN2017/101046 dated May 21, 2018.
(Continued)

*Primary Examiner* — Richard M Lorence
(74) *Attorney, Agent, or Firm* — Fox Rothschild LLP; Carol Thorstad-Forsyth

(57) ABSTRACT

The present disclosure discloses a vehicle two-power-source dual driving assembly, wherein, the vehicle two-power-source dual driving assembly comprises two sets of driving units that are symmetrically arranged, the two sets of driving units connect to a same set of vehicle axle half shafts, each of the sets of driving units is provided with a power source and an automatic transmission, and each of the automatic transmissions connects to one of the vehicle axle half shafts. The automatic transmission is provided therein with an input shaft, an intermediate shaft and an output shaft that are parallel, the input shaft, the intermediate shaft and the output shaft are provided thereon with multistage gears with different transmission ratios, the power source connects to the
(Continued)

input shaft, and the output shaft connects to a left half shaft or a right half shaft of the vehicle axle half shaft. The present disclosure can realize transmission of two speed ratios, with flexible transmission modes, which shortens the axial size of the driving assembly, which cannot only satisfy the acceleration capability and climbing ability of the vehicle but also satisfy the demand on high vehicle speed.

9 Claims, 7 Drawing Sheets

(51) Int. Cl.
| | | |
|---|---|---|
| *B60K 17/04* | (2006.01) | |
| *B60K 17/08* | (2006.01) | |
| *F16H 3/091* | (2006.01) | |
| *F16D 11/00* | (2006.01) | |
| *B60K 7/00* | (2006.01) | |
| *F16D 25/00* | (2006.01) | |
| *F16D 28/00* | (2006.01) | |
| *F16H 3/089* | (2006.01) | |

(52) U.S. Cl.
CPC .............. *B60K 17/08* (2013.01); *F16D 11/00* (2013.01); *F16H 3/091* (2013.01); *F16D 25/00* (2013.01); *F16D 28/00* (2013.01); *F16H 3/089* (2013.01)

(58) Field of Classification Search
CPC ..................... B60K 17/08; F16H 3/006; F16H 2003/007; F16H 3/08; F16H 2003/0811; F16H 2003/0818; F16H 2003/0826; F16H 3/089; F16H 3/091
See application file for complete search history.

(56) References Cited

U.S. PATENT DOCUMENTS

| | | | | |
|---|---|---|---|---|
| 4,431,073 A | * | 2/1984 | Nagao | B60K 17/043 180/307 |
| 5,417,125 A | * | 5/1995 | Janiszewski | B60K 17/06 74/359 |
| 8,678,118 B2 | * | 3/2014 | Takenaka | H02K 7/006 180/65.6 |
| 8,701,806 B2 | * | 4/2014 | Ishii | B60K 7/0007 180/65.6 |
| 8,738,207 B2 | * | 5/2014 | Holmes | B60K 6/448 701/22 |
| 2003/0232678 A1 | | 12/2003 | Yamauchi et al. | |
| 2009/0124458 A1 | | 5/2009 | Yang | |
| 2010/0206649 A1 | * | 8/2010 | Ishii | B60K 7/0015 310/156.35 |
| 2013/0240318 A1 | * | 9/2013 | Mori | F16D 11/10 192/69.9 |
| 2019/0016215 A1 | * | 1/2019 | Yu | B60K 6/387 |
| 2019/0331200 A1 | * | 10/2019 | Barendrecht | B60K 17/046 |
| 2021/0046819 A1 | * | 2/2021 | Yu | B60K 17/22 |

FOREIGN PATENT DOCUMENTS

| | | | | |
|---|---|---|---|---|
| CN | 202463563 U | | 10/2012 | |
| CN | 204459019 U | | 7/2015 | |
| CN | 104972890 | | 10/2015 | |
| CN | 204716884 U | | 10/2015 | |
| CN | 206106913 U | | 4/2017 | |
| CN | 106864232 A | | 6/2017 | |
| CN | 206280446 U | * | 6/2017 | ............. F16H 3/093 |
| CN | 207128596 U | | 3/2018 | |
| DE | 19858124 A1 | | 7/2000 | |
| JP | 201585765 A | | 5/2015 | |
| JP | 2016205444 A | | 12/2016 | |

OTHER PUBLICATIONS

International Preliminary Report on Patentability issued in PCT/CN2017/101046 dated Jan. 28, 2020.
European Search Report issued in European Patent Application No. 17919097.0 dated Mar. 22, 2021.
Notice of Reasons for Refusal issued in Japanese Patent Application No. 2020-503920 dated Nov. 4, 2021.

\* cited by examiner

VEHICLE TWO-POWER-SOURCE DUAL DRIVING ASSEMBLY

RELATED APPLICATION DATA

The present application is the U.S. National Phase of International Patent Application No. PCT/CN2017/101046, filed on Sep. 8, 2017 and entitled "VEHICLE TWO-POWER-SOURCE DUAL DRIVING ASSEMBLY," which claims priority to Chinese Patent Application No. CN 201710624209.9, filed on Jul. 27, 2017 and entitled "VEHICLE TWO-POWER-SOURCE DUAL DRIVING ASSEMBLY," the contents of which are incorporated herein by reference in their entireties.

TECHNICAL FIELD

The present disclosure relates to a vehicle two-power-source dual driving assembly, connected to the vehicle front axle or rear axle, for driving the vehicle.

BACKGROUND ART

In current purely electrical driven or mixed power new energy automobiles, the dynamic characteristics of the employed electric motors do not conform to the requirements on the entire vehicle, which cannot satisfy the requirements on speed ratio and torque. Because new energy automobiles are required to face increasingly complicated operating conditions and road conditions, and the users are having increasingly higher requirements on the comfort degree and the endurance mileage of new energy automobiles, the new energy automobiles of simple electric motor directly driving mode, electric-motor-connected-to-speed-reducer mode or oil-electricity mixed power mode cannot satisfy the demands on the development of the new energy automobile industry.

Some special vehicles have higher requirement on the vehicle speed, such as sports cars and racing cars. Those special vehicles can obtain high speed on even road surfaces, but the speed is difficult to increase on complicated road surfaces. The existing purely electrical driven or mixed power driving systems cannot satisfy the requirements on the acceleration capability, climbing ability and maximum vehicle speed of vehicles.

SUMMARY OF THE DISCLOSURE

Regarding the above problems in the prior art, the present disclosure provides a vehicle two-power-source dual driving assembly, to solve the problem that the existing power assemblies have transmission of single speed ratio, which cannot satisfy the demands on the acceleration capability, climbing ability and highest speed of vehicles and cannot adapt for complicated road conditions and operating conditions.

To achieve the above objects, the technical solutions of the present disclosure are realized as follows:

The present disclosure provides a vehicle two-power-source dual driving assembly, wherein, the vehicle two-power-source dual driving assembly comprises two sets of driving units that are symmetrically arranged, the two sets of driving units are connected to a same set of vehicle axle half shafts, each of the sets of driving units is provided with a power source and an automatic transmission, and the power source and the automatic transmission are an integrated structure;

two automatic transmissions are symmetrically arranged in two separated boxes, and there is no connection between two automatic transmissions;

each of the automatic transmissions connects to one of the vehicle axle half shafts, and each automatic transmission has two mutually switchable speed ratios.

The present disclosure, which employs the above structure configurations, has the following advantages:

The vehicle two-power-source dual driving assembly of the present disclosure comprises two sets of driving units that are symmetrically arranged, the two sets of driving units connect to a same set of vehicle axle half shafts, and each of the sets of driving units is provided with a power source and an automatic transmission, which can provide large driving force to vehicles, and substantially increase car speed, and can be used in special vehicles such as sports cars and racing cars.

Through the integrated structure of the power source and the automatic transmission, the present disclosure solves the problems that the existing power assembly has a large axial size and is difficult to be arranged on the vehicle, and that there are many gears in the transmission and the transmission structure is complex. Moreover, it can also reduce the impact of the rotor shaft of the power source on the automatic transmission, reduce the wear of the automatic transmission, and improve the mileage and service life of the vehicle.

In the present disclosure, two automatic transmissions are arranged symmetrically in two separated boxes, and there is no connection between two automatic transmissions, which is conducive to realizing the modularization of the automatic transmission.

In the vehicle two-power-source dual driving assembly of the present disclosure, each automatic transmission is respectively connected to the rear axle half shaft or front axle half shaft of the vehicle, and each automatic transmission has two mutually switchable speed ratios, so that the vehicle driving assembly can realize transmission of two speed ratios, with flexible transmission modes, which satisfies the demands of the vehicle on traveling on different road conditions. When the vehicle needs quick acceleration or is climbing a slope with a weight burden, it can select the transmission of the larger speed ratio, to increase the driving force of the entire vehicle and overcome the defect of the deficient driving force of the entire vehicle. When the entire vehicle is in the cruising condition, it can select the transmission of the smaller speed ratio, to satisfy the requirement by the entire vehicle on high speed traveling, save energy, and increase the endurance mileage of the vehicle.

The vehicle two-power-source dual driving assembly of the present disclosure does not only shorten the axial size of the driving assembly, which facilitates the arranging in the entire vehicle, but also, because it uses less number of gears, simplify the transmission structure.

Figure 1:
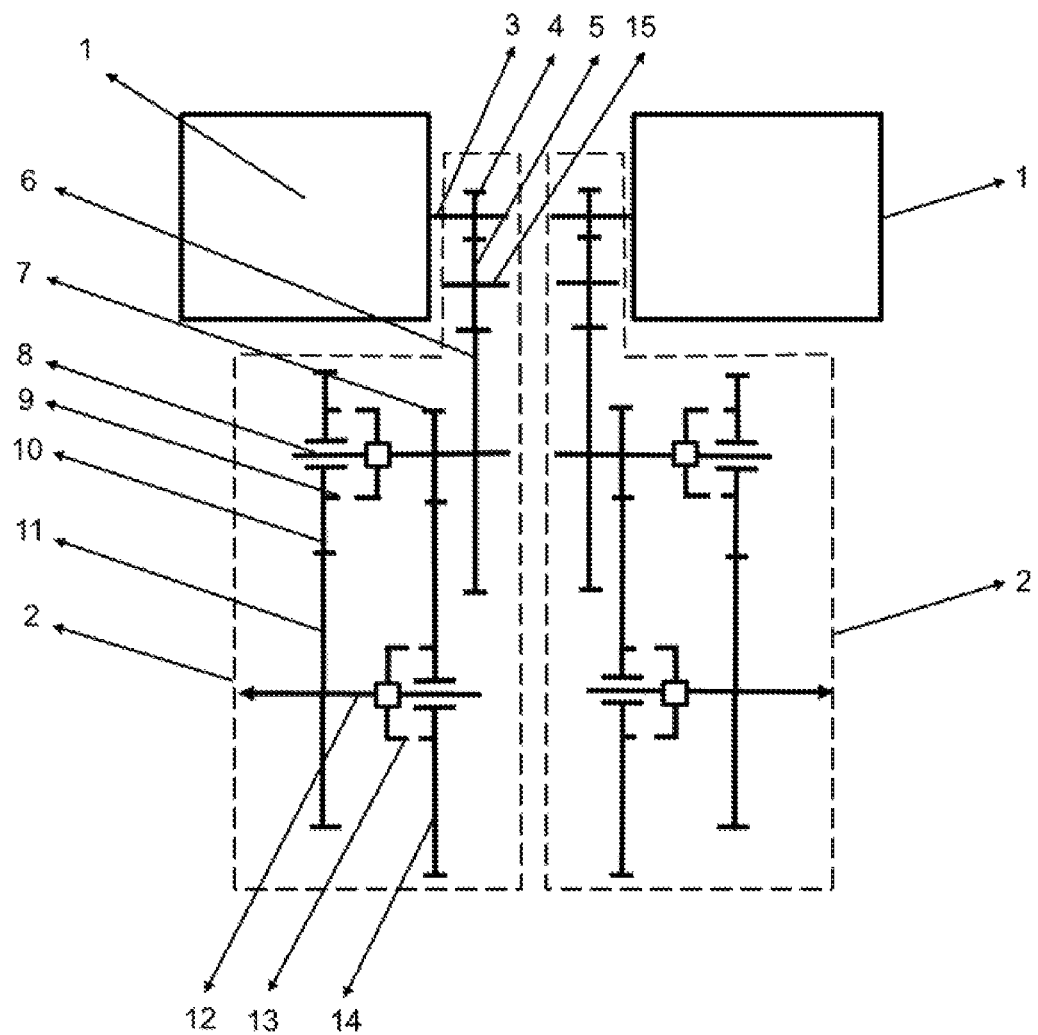
FIG. 1 is the structural schematic diagram of the vehicle two-power-source dual driving assembly of the first embodiment of the present disclosure.

In the drawings: 1. power source; 2. automatic transmission; 3. input shaft; 4. first gear; 5. idle gear; 6. second gear; 7. sixth gear; 8. intermediate shaft; 9. second-gear clutch; 10. third gear; 11. fourth gear; 12. output shaft; 13. first-gear clutch; 14. fifth gear; 15. idler shaft; 16. bidirectional clutch; and 17. bidirectional clutch.

DETAILED DESCRIPTION

In order to make the objects, the technical solutions and the advantages of the present disclosure clearer, the embodiments of the present disclosure will be described below in further detail in conjunction with the drawings.

First Embodiment

FIG. 1 shows the first embodiment of the present disclosure. In the present embodiment, the present disclosure discloses a vehicle two-power-source dual driving assembly, wherein, the vehicle two-power-source dual driving assembly comprises two sets of driving units that are symmetrically arranged, the two sets of driving units connect to a same set of vehicle axle half shafts, each of the sets of driving units is provided with a power source 1 and an automatic transmission 2 (shown by the dotted line in FIG. 1), each of the automatic transmissions 2 connects to one of the vehicle axle half shafts, and each automatic transmission 2 has two mutually switchable speed ratios.

As shown by FIG. 1, the automatic transmission 2 is provided therewith with an input shaft 3, an intermediate shaft 8 and an output shaft 12 that are parallel, the power source 1 connects to the input shaft 12, and the output shaft 3 connects to a left half shaft or a right half shaft of the vehicle axle half shaft.

In that, the automatic transmission 2 on the left connects to the left half shaft of the vehicle axle half shaft, and the automatic transmission 2 on the right connects to the right half shaft of the vehicle axle half shaft.

The input shaft 3 is connected to the intermediate shaft 8 via a first gear train. A second gear train and a third gear train that have different transmission ratios are provided between the intermediate shaft 8 and the output shaft 12, and the intermediate shaft 8 and the output shaft 12 are provided with a clutch for the switching between the second gear train and the third gear train.

The first gear train comprises a first gear 4 provided on the input shaft 3 and a second gear 6 provided on the intermediate shaft 8, and the first gear 4 and the second gear 6 are engaged. Alternatively, an idle gear 5 is provided between the first gear 4 and the second gear 6, as shown in FIGS. 1 and 3-7.

The second gear train comprises a third gear 10 provided on the intermediate shaft 8 and a fourth gear 11 that is provided on the output shaft 12 and is engaged with the third gear 10, the third gear 10 is idle-nested to the intermediate shaft 8, and the fourth gear 11 is connected to the output shaft 12 by a key.

The third gear train comprises a fifth gear 14 provided on the output shaft 12 and a sixth gear 7 that is provided on the intermediate shaft 8 and is engaged with the fifth gear 14, the fifth gear 14 is idle-nested to the output shaft 12, and the sixth gear 7 is connected to the intermediate shaft 8 by a key.

The clutch comprises a first-gear clutch 13 and a second-gear clutch 9, the first-gear clutch 13 is provided on the output shaft 12 and is used to be connected to the fifth gear 14 idle-nested to the output shaft, and the second-gear clutch 9 is provided on the intermediate shaft 8 and is used to be connected to the third gear 10 idle-nested to the intermediate shaft 8.

The detailed structure is in detail illustrated below by taking the driving unit on the left as the example. As shown by FIG. 1, the input shaft 3 is provided thereon with a first gear 4, the intermediate shaft 8 is provided thereon with a second gear 6, an idle gear 5 is provided between the first gear 4 and the second gear 6, the idler shaft 15 is parallel to the input shaft 3, and the first gear 4, the idle gear 5 and the second gear 6 engage to form a triple gear.

Figure 2:
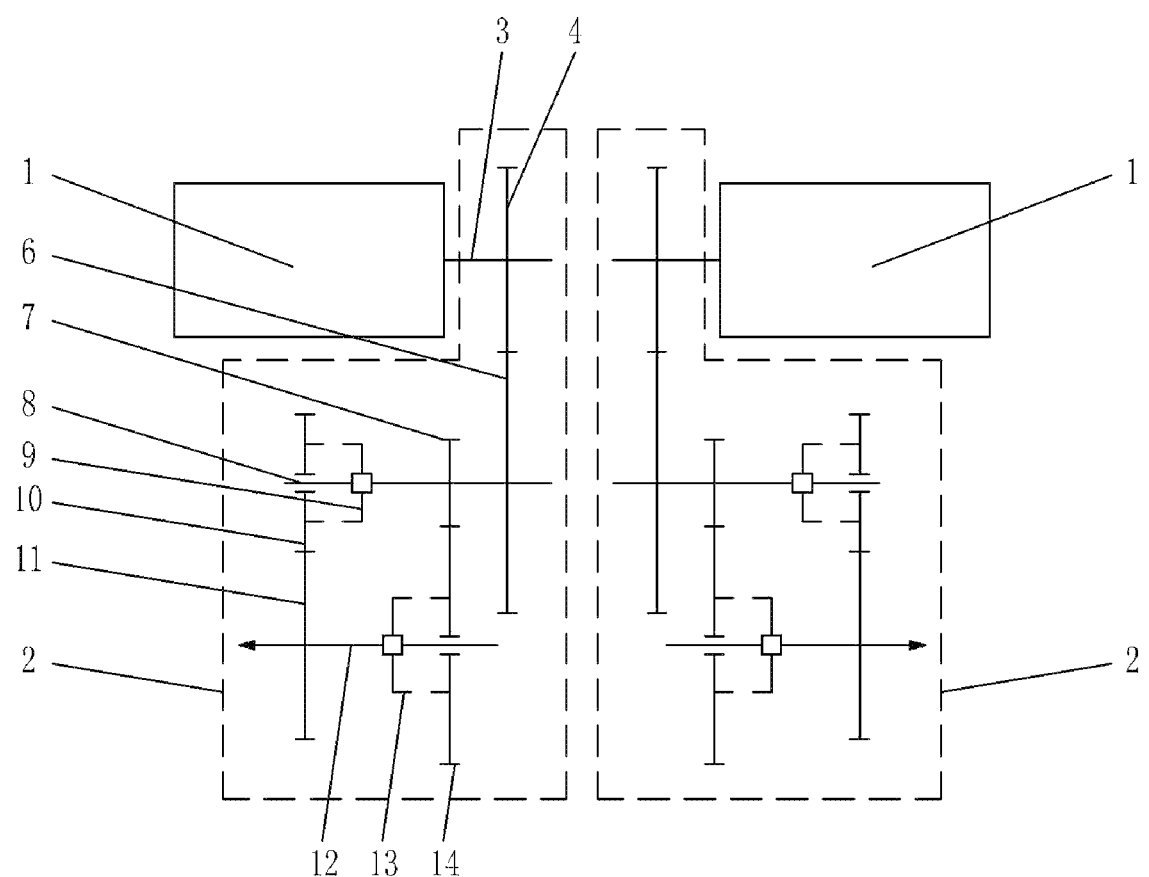
FIG. 2 is the structural schematic diagram of the vehicle two-power-source dual driving assembly of the first embodiment of the present disclosure (without the idle gear).

The idle gear 5 is installed according to the requirements on the structural dimensions, and it does not change the magnitude of the transmission ratio of the first gear 4 to the second gear 6. The idle gear 5 may not be provided, and the first gear 4 and the second gear 6 are in direct engaged transmission, as shown by FIG. 2.

The intermediate shaft 8 is provided with a third gear 10 rotatably installed and a sixth gear 7 fixedly installed, and the output shaft 12 is provided with a fourth gear 11 fixedly installed and a fifth gear 14 rotatably installed and installed, wherein the third gear 10 and the fourth gear 11 are in engaged transmission, and have different installing modes on the shafts, and wherein the fifth gear 14 and the sixth gear 7 are in engaged transmission, and have different installing modes on the shafts.

A second-gear clutch 9 is provided between the intermediate shaft 8 and the third gear 10 rotatably installed thereon, and a first-gear clutch 13 is provided between the output shaft 12 and the fifth gear 14 rotatably installed thereon.

The third gear 10 is rotatably installed on the intermediate shaft 8 via a needle bearing, and the fifth gear 14 is rotatably installed on the output shaft 12 via a needle bearing. Both of the third gear 10 and the fifth gear 14 do not axially move, although they are rotatably installed.

The engagement transmission ratio of the first gear 4 to the second gear 6 in the first gear train is i1, or the engagement transmission ratio of the triple gear of the first gear 4, the idle gear 5 and the second gear 6 is i1, the engagement transmission ratio of the fifth gear 14 to the sixth gear 7 in the third gear train is i2, the engagement transmission ratio of the third gear 10 to the fourth gear 11 in the second gear train is i3, and the engagement transmission ratio in the automatic transmission 2 is i1×i2 or i1×i3.

As shown by FIG. 1, the structures of the driving unit on the right and the driving unit on the left are of mirror image relation, which will not be in detail illustrated here.

When the first-gear clutch 13 is closed and the second-gear clutch 9 is opened, the power source 1 transmits power to the vehicle axle half shaft via successively the input shaft 3, the first gear 4, the idle gear 5, the second gear 6, the intermediate shaft 8, the sixth gear 7, the fifth gear 14, the first-gear clutch 13 and the output shaft 12, and the engagement transmission ratio in the automatic transmission 2 is i1×i2. That is the first operating condition.

When the second-gear clutch 9 is closed and the first-gear clutch 13 is opened, the power source 1 transmits power to the vehicle axle half shaft via successively the input shaft 3, the first gear 4, the idle gear 5, the second gear 6, the intermediate shaft 8, the second-gear clutch 9, the third gear 10, the fourth gear 11 and the output shaft 12, and the engagement transmission ratio in the automatic transmission 2 is i1×i3. That is the second operating condition.

When both of the first-gear clutch 13 and the second-gear clutch 9 are opened, neutral position is realized, and at this point no power is outputted to the vehicle axle half shaft.

In that, the magnitudes of the transmission ratios i1, i2 and i3 can be changed by changing the sizes or the tooth numbers of the gears, to change the transmission ratio of the automatic transmission.

Preferably, the gear shifting sequence of the driving unit on the right is the same as that of the driving unit on the left, and therefore the rotation speeds of the wheels on the inner side and the outer side of the vehicle are the same. Generally, in the steering of the vehicle, it is required that the rotation speeds of the wheels on the inner side and the outer side are different, and at this point that may be adjusted by changing the rotation speed of the power source 1.

It can be known from the above that, the vehicle driving assembly can realize transmission of two speed ratios, and the automatic transmission, according to the control strategy program, can realize the electrically controlled automatic transmission of two gears. The transmission modes are flexible, which satisfies the demands of the vehicle on traveling on different road conditions. When the vehicle is starting, accelerating and climbing a slope with a weight burden, it can select the transmission of the larger speed ratio, to increase the driving force of the entire vehicle and overcome the defect of the deficient driving force of the entire vehicle. When the entire vehicle is in the cruising condition, it can select the transmission of the smaller speed ratio, to satisfy the requirement by the entire vehicle on high speed traveling, save energy, and increase the endurance mileage of the vehicle.

The rotor shaft of the power source 1 and the input shaft 3 are of integrated design, which can reduce the impact by the rotor shaft on the automatic transmission 2.

The power source 1 is an electric motor, and may also be an engine.

The connection structure between the output shaft 12 and the left half shaft or the right half shaft may employ spline connection, or employ shaft coupling connection, or be integrally manufactured.

The first-gear clutch 13 and the second-gear clutch 9 are contrate tooth clutches, comprising a movable fluted disc and a fixed fluted disc. The movable fluted disc of the first-gear clutch 13 is rotatably fixed but axially movable relative to the output shaft 12, and the mating fixed fluted disc is fixed on the fifth gear 14. The movable fluted disc of the second-gear clutch 9 is rotatably fixed but axially movable relative to the intermediate shaft 8, and the mating fixed fluted disc is fixed on the third gear 10.

In the first-gear clutch 13 and the second-gear clutch 9, the movable fluted disc may slide on the shaft via a spline. The center hole of the movable fluted disc is provided with an internal spline, and correspondingly external splines are provided on the output shaft 12 and the intermediate shaft 8, and should have larger lengths than the internal spline of the movable fluted disc, merely by which the movable fluted disc can be nested on the shafts, and can axially slide and output torques.

The movable fluted disc is provided with end face transmission teeth or tooth spaces, and the fixed fluted disc is correspondingly provided with end face tooth spaces or transmission teeth. The contrate tooth clutches, compared with friction clutches, can reduce kinetic energy loss to the largest extent, which overcomes the defect of traditional friction clutches of too short lives because they cannot withstand the dynamic shock of the electric motor.

The driving type of the contrate tooth clutches may be electromagnetic driving type, by driving by electromagnet adsorption, or hydraulic driving type, by driving by a hydraulic mechanism, or pneumatic driving type, by driving by a pneumatic mechanism, or electrical driving type, by driving by an electric motor, or mechanic shifting fork driving type, by driving by a shifting fork, and the contrate tooth clutches drive the movable fluted disc to axially move to engage with the fixed fluted disc.

In the case that the first-gear clutch 13 and the second-gear clutch 9 are electromagnetic jaw clutches, when the vehicle driving assembly has power inputting, the electromagnetic jaw clutches can enable the power and the entire vehicle to be released and engaged instantly at any torque, which realizes the smooth switch of the power and increases the traveling stability of the vehicle.

Alternatively, the first-gear clutch 13 and the second-gear clutch 9 employ wet clutches, and the wet clutches are provided therein with dual friction plates and steel plates, and enable the friction plates and the steel plates to contact or separate by hydraulic oil driving, thereby realizing clutching. The wet clutches are required to be installed to realize the clutching of the intermediate shaft 8 and the third gear 10 rotatably installed thereon, and the clutching of the output shaft 12 and the fifth gear 14 rotatably installed thereon.

In the embodiments of the present disclosure, the vehicle axle half shaft is a rear axle half shaft, and may also be a front axle half shaft. When the vehicle driving assembly connects to the front axle half shaft, the vehicle is in the front driving mode, and when the vehicle driving assembly connects to the rear axle half shaft, the vehicle is of the rear driving mode.

The structure of the vehicle axle half shaft is not shown by FIGS. 1 and 2, and the actual structure comprises a left half shaft and a right half shaft, wherein a differential is not required to be provided between the two half shafts.

Second Embodiment

Figure 3:
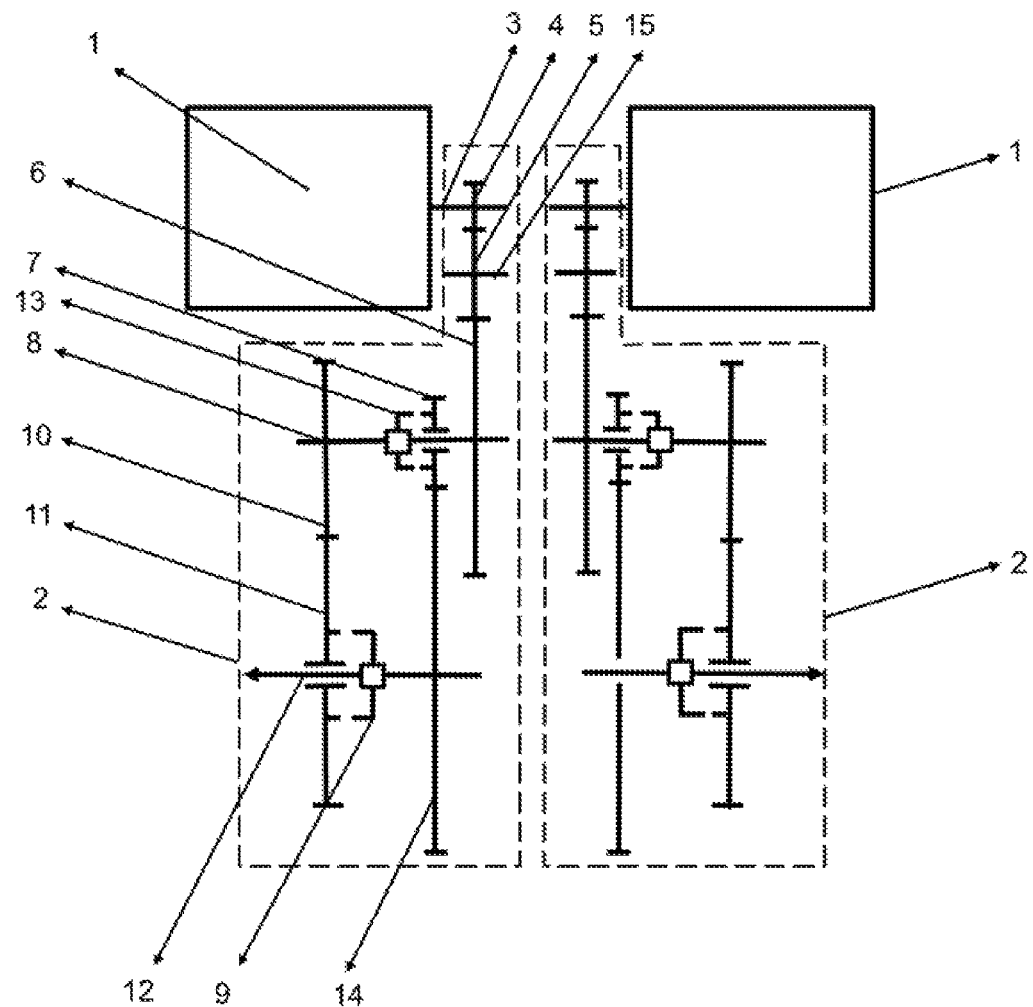
FIG. 3 is the structural schematic diagram of the vehicle two-power-source dual driving assembly of the second embodiment of the present disclosure.

FIG. 3 shows the second embodiment of the present disclosure. The second embodiment of the present disclosure is improvement that is made on the basis of the first embodiment, and the difference between the second embodiment and the first embodiment of the present disclosure is that, as shown by FIG. 3, in the driving unit on the left, the first-gear clutch 13 is rotatably fixed but axially movable relative to the intermediate shaft 8, the mating fixed fluted disc is fixed on the sixth gear 7, the sixth gear 7 is rotatably installed on the intermediate shaft 8, and the fifth gear 14 is fixedly installed on the output shaft 12. The second-gear clutch 9 is rotatably fixed but axially movable relative to the output shaft 12, the mating fixed fluted disc is fixed on the fourth gear 11, the fourth gear 11 is rotatably installed on the output shaft 12, and the third gear 10 is fixedly installed on the intermediate shaft 8.

As shown by FIG. 3, the structures of the driving unit on the right and the driving unit on the left are of mirror image relation, which will not be in detail illustrated here.

It is set that the engagement transmission ratio of the first gear 4 to the second gear 6 is i1, or the engagement transmission ratio of the triple gear is i1, the engagement transmission ratio of the fifth gear 14 to the sixth gear 7 is i2, and the engagement transmission ratio of the third gear 10 to the fourth gear 11 is i3.

When the first-gear clutch 13 is closed and the second-gear clutch 9 is opened, the power source 1 transmits power to the vehicle axle half shaft via successively the input shaft 3, the first gear 4, the idle gear 5, the second gear 6, the intermediate shaft 8, the first-gear clutch 13, the sixth gear 7, the fifth gear 14 and the output shaft 12, and the engagement transmission ratio in the automatic transmission 2 is i1×i2. That is the first operating condition.

When the second-gear clutch 9 is closed and the first-gear clutch 13 is opened, the power source 1 transmits power to the vehicle axle half shaft via successively the input shaft 3, the first gear 4, the idle gear 5, the second gear 6, the intermediate shaft 8, the third gear 10, the fourth gear 11, the second-gear clutch 9 and the output shaft 12, and the engagement transmission ratio in the automatic transmission 2 is i1×i3. That is the second operating condition.

When both of the first-gear clutch 13 and the second-gear clutch 9 are opened, neutral position is realized, and at this point no power is outputted to the vehicle axle half shaft.

The gear shifting sequence of the driving unit on the right is the same as that of the driving unit on the left.

The other contents of the second embodiment of the present disclosure are the same as those of the first embodiment, and will not be described repeatedly here.

Third Embodiment

Figure 4:
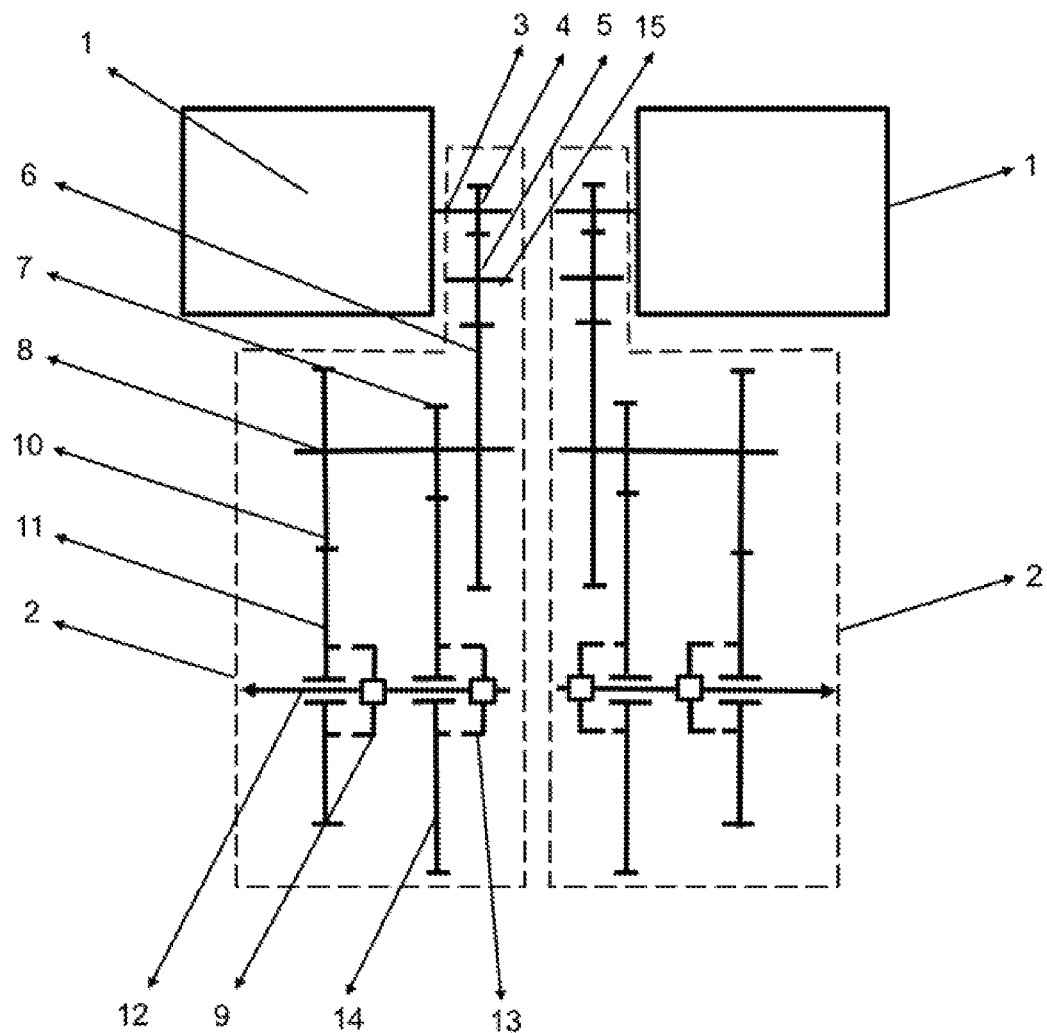
FIG. 4 is the structural schematic diagram of the vehicle two-power-source dual driving assembly of the third embodiment of the present disclosure.

FIG. 4 shows the third embodiment of the present disclosure. The third embodiment of the present disclosure is improvement that is made on the basis of the first embodiment, and the difference between the third embodiment and the first embodiment of the present disclosure is that, as shown by FIG. 4, the clutch comprises a first-gear clutch 13 and a second-gear clutch 9 that are coaxially provided on the output shaft 12, the first-gear clutch 13 is configured to be connected to the third gear train, and the second-gear clutch 9 is configured to be connected to the second gear train. In the driving unit on the left, the second-gear clutch 9 is rotatably fixed but axially movable relative to the output shaft 12, the mating fixed fluted disc is fixed on the fourth gear 11, the fourth gear 11 is rotatably installed on the output shaft 12, and the third gear 10 is fixedly installed on the intermediate shaft 8; the first-gear clutch 13 is rotatably installed on the output shaft 12, the mating fixed fluted disc is fixed on the fifth gear 14, the fifth gear 14 is rotatably installed on the output shaft 12, and the sixth gear 7 is fixedly installed on the intermediate shaft 8.

As shown by FIG. 4, the structures of the driving unit on the right and the driving unit on the left are of mirror image relation, which will not be in detail illustrated here.

It is set that the engagement transmission ratio of the first gear 4 to the second gear 6 is i1, or the engagement transmission ratio of the triple gear is i1, the engagement transmission ratio of the fifth gear 14 to the sixth gear 7 is i2, and the engagement transmission ratio of the third gear 10 to the fourth gear 11 is i3.

When the first-gear clutch 13 is closed and the second-gear clutch 9 is opened, the power source 1 transmits power to the vehicle axle half shaft via successively the input shaft 3, the first gear 4, the idle gear 5, the second gear 6, the intermediate shaft 8, the sixth gear 7, the fifth gear 14, the first-gear clutch 13 and the output shaft 12, and the engagement transmission ratio in the automatic transmission 2 is i1×i2. That is the first operating condition.

When the second-gear clutch 9 is closed and the first-gear clutch 13 is opened, the power source 1 transmits power to the vehicle axle half shaft via successively the input shaft 3, the first gear 4, the idle gear 5, the second gear 6, the intermediate shaft 8, the third gear 10, the fourth gear 11, the second-gear clutch 9 and the output shaft 12, and the engagement transmission ratio in the automatic transmission 2 is i1×i3. That is the second operating condition.

When both of the first-gear clutch 13 and the second-gear clutch 9 are opened, neutral position is realized, and at this point no power is outputted to the vehicle axle half shaft.

The gear shifting sequence of the driving unit on the right is the same as that of the driving unit on the left.

The other contents of the third embodiment of the present disclosure are the same as those of the first embodiment, and will not be described repeatedly here.

Fourth Embodiment

Figure 5:
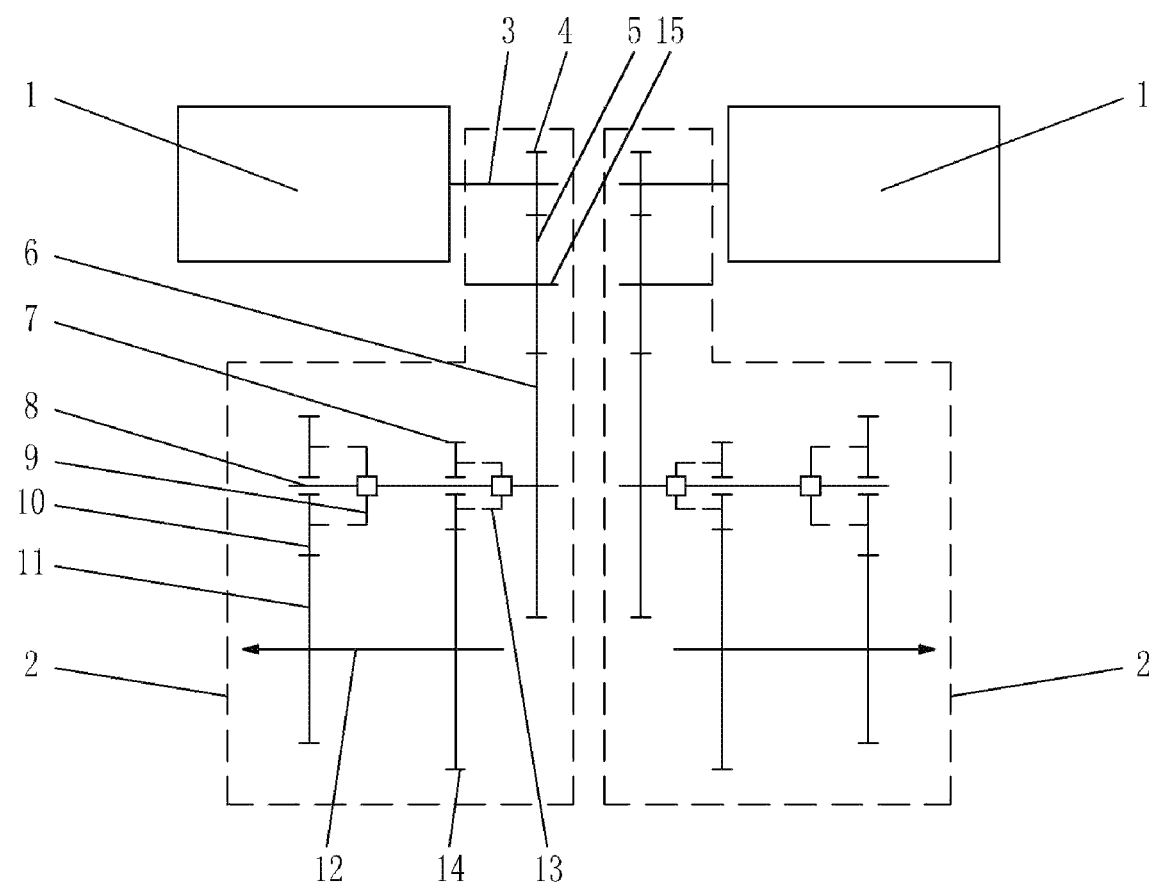
FIG. 5 is the structural schematic diagram of the vehicle two-power-source dual driving assembly of the fourth embodiment of the present disclosure.

FIG. 5 shows the fourth embodiment of the present disclosure. The fourth embodiment of the present disclosure is improvement that is made on the basis of the first embodiment, and the difference between the fourth embodiment and the first embodiment of the present disclosure is that, as shown by FIG. 5, the clutch comprises a first-gear clutch 13 and a second-gear clutch 9 that are coaxially provided on the intermediate shaft 8, the first-gear clutch 13 is configured to be connected to the third gear train, and the second-gear clutch 9 is configured to be connected to the second gear train. In the driving unit on the left, the first-gear clutch 13 is rotatably fixed but axially movable relative to the intermediate shaft 8, the mating fixed fluted disc is fixed on the sixth gear 7, the sixth gear 7 is rotatably installed on the intermediate shaft 8, and the fifth gear 14 is fixedly installed on the output shaft 12; the second-gear clutch 9 is rotatably fixed but axially movable relative to the intermediate shaft 8, the mating fixed fluted disc is fixed on the third gear 10, the third gear 10 is rotatably installed on the intermediate shaft 8, and the fourth gear 11 is fixedly installed on the output shaft 12.

As shown by FIG. 5, the structures of the driving unit on the right and the driving unit on the left are of mirror image relation, which will not be in detail illustrated here.

It is set that the engagement transmission ratio of the first gear 4 to the second gear 6 is i1, or the engagement transmission ratio of the triple gear is i1, the engagement transmission ratio of the fifth gear 14 to the sixth gear 7 is i2, and the engagement transmission ratio of the third gear 10 to the fourth gear 11 is i2.

When the first-gear clutch 13 is closed and the second-gear clutch 9 is opened, the power source 1 transmits power to the vehicle axle half shaft via successively the input shaft 3, the first gear 4, the idle gear 5, the second gear 6, the intermediate shaft 8, the first-gear clutch 13, the sixth gear 7, the fifth gear 14 and the output shaft 12, and the engagement transmission ratio in the automatic transmission 2 is i1×i2. That is the first operating condition.

When the second-gear clutch 9 is closed and the first-gear clutch 13 is opened, the power source 1 transmits power to the vehicle axle half shaft via successively the input shaft 3, the first gear 4, the idle gear 5, the second gear 6, the intermediate shaft 8, the second-gear clutch 9, the third gear 10, the fourth gear 11 and the output shaft 12, and the engagement transmission ratio in the automatic transmission 2 is i1×i3. That is the second operating condition.

When both of the first-gear clutch 13 and the second-gear clutch 9 are opened, neutral position is realized, and at this point no power is outputted to the vehicle axle half shaft.

The gear shifting sequence of the driving unit on the right is the same as that of the driving unit on the left.

The other contents of the fourth embodiment of the present disclosure are the same as those of the first embodiment, and will not be described repeatedly here.

Fifth Embodiment

Figure 6:
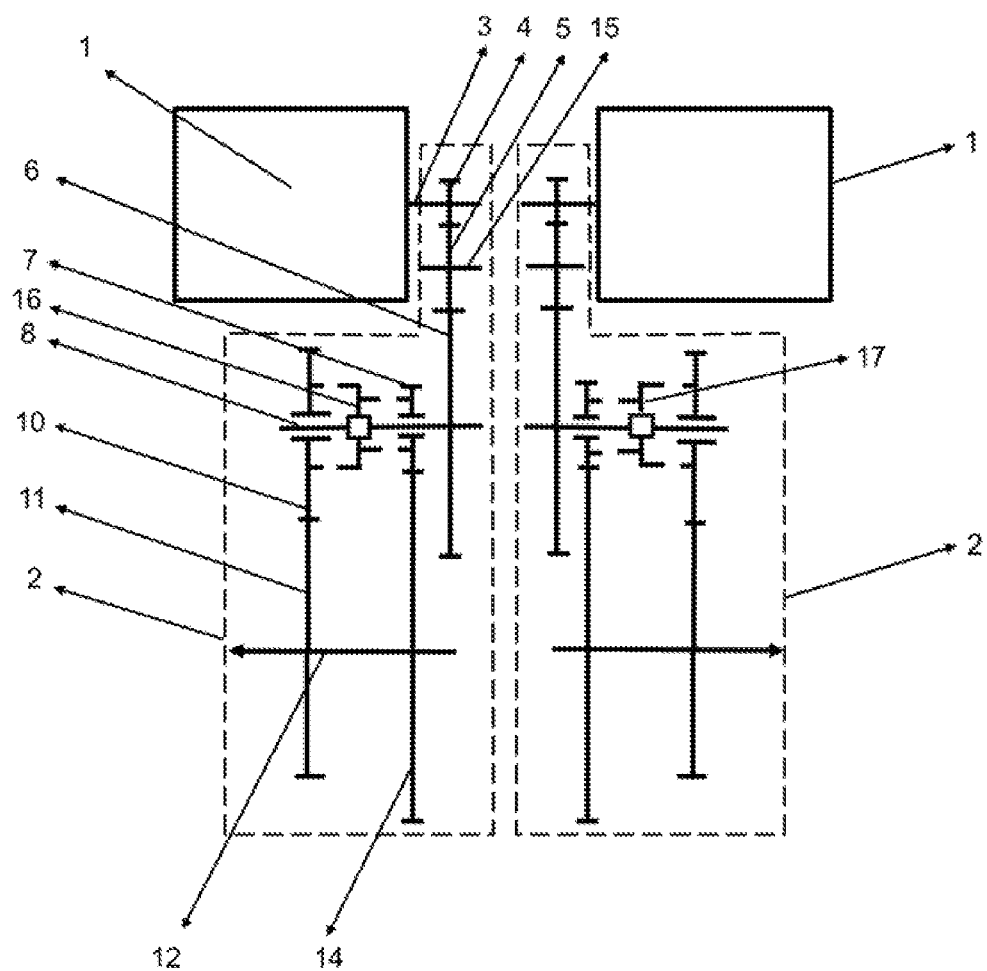
FIG. 6 is the structural schematic diagram of the vehicle two-power-source dual driving assembly of the fifth embodiment of the present disclosure.

FIG. 6 shows the fifth embodiment of the present disclosure. The fifth embodiment of the present disclosure is improvement that is made on the basis of the first embodiment, and the difference between the fifth embodiment and the first embodiment of the present disclosure is that, as shown by FIG. 6, the clutch is a bidirectional clutch 16 that is nested to the intermediate shaft 8, and the bidirectional clutch 16 slides in the axial direction to be connected to the third gear train or the second gear train. In the driving unit on the left, a bidirectional clutch 16 is rotatably fixed but axially movable relative to the intermediate shaft 8, contrate teeth are provided on both of the left and right sides of the bidirectional clutch 16, which is equivalent to two movable fluted discs, both of the third gear 10 and the sixth gear 7 are rotatably installed on the intermediate shaft 8, and both of the two gears are provided with fixed mating fixed fluted discs, both of the fourth gear 11 and the fifth gear 14 are fixedly installed on the output shaft 12.

As shown by FIG. 6, the structures of the driving unit on the right and the driving unit on the left are of mirror image relation, which will not be in detail illustrated here.

It is set that the engagement transmission ratio of the first gear 4 to the second gear 6 is i1, or the engagement transmission ratio of the triple gear is i1, the engagement transmission ratio of the fifth gear 14 to the sixth gear 7 is i2, and the engagement transmission ratio of the third gear 10 to the fourth gear 11 is i3.

When the bidirectional clutch 16 moves to the right, it can close with the fixed fluted disc on the sixth gear 7, the power source 1 transmits power to the vehicle axle half shaft via successively the input shaft 3, the first gear 4, the idle gear 5, the second gear 6, the intermediate shaft 8, the bidirectional clutch 16, the sixth gear 7, the fifth gear 14 and the output shaft 12, and the engagement transmission ratio in the automatic transmission 2 is i1×i2. That is the first operating condition.

When the bidirectional clutch 16 moves to the left, it can close with the fixed fluted disc on the third gear 10, the power source 1 transmits power to the vehicle axle half shaft via successively the input shaft 3, the first gear 4, the idle gear 5, the second gear 6, the intermediate shaft 8, the bidirectional clutch 16, the third gear 10, the fourth gear 11 and the output shaft 12, and the engagement transmission ratio in the automatic transmission 2 is i1×i3. That is the second operating condition.

When the bidirectional clutch 16 is in the middle to open both of the sixth gear 7 and the third gear 10, neutral position is realized, and at this point no power is outputted to the vehicle axle half shaft.

The gear shifting sequence of the driving unit on the right is the same as that of the driving unit on the left.

The other contents of the fifth embodiment of the present disclosure are the same as those of the first embodiment, and will not be described repeatedly here.

Sixth Embodiment

Figure 7:
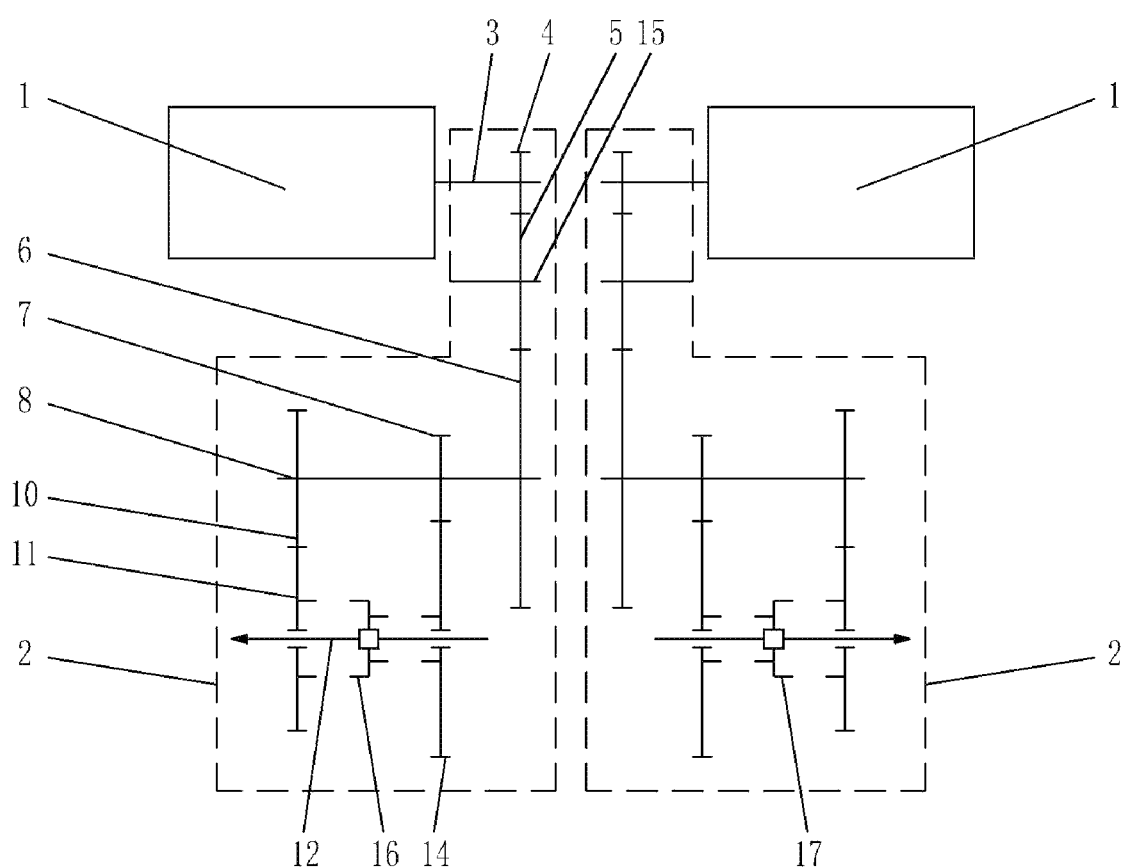
FIG. 7 is the structural schematic diagram of the vehicle two-power-source dual driving assembly of the sixth embodiment of the present disclosure.

FIG. 7 shows the sixth embodiment of the present disclosure. The sixth embodiment of the present disclosure is improvement that is made on the basis of the fifth embodiment, and the difference between the sixth embodiment and the fifth embodiment of the present disclosure is that, as shown by FIG. 7, in the driving unit on the left, the bidirectional clutch 16 is rotatably fixed but axially movable relative to the output shaft 12, contrate teeth are provided on both of the left and right sides of the bidirectional clutch 16, which is equivalent to two movable fluted discs, both of the fourth gear 11 and the fifth gear 14 are rotatably installed on the output shaft 12, and both of the two gears are provided with fixed mating fixed fluted discs, and both of the third gear 10 and the sixth gear 7 are fixedly installed on the intermediate shaft 8.

As shown by FIG. 7, the structures of the driving unit on the right and the driving unit on the left are of mirror image relation, which will not be in detail illustrated here.

It is set that the engagement transmission ratio of the first gear 4 to the second gear 6 is i1, or the engagement transmission ratio of the triple gear is i1, the engagement transmission ratio of the fifth gear 14 to the sixth gear 7 is i2, and the engagement transmission ratio of the third gear 10 to the fourth gear 11 is i3.

When the bidirectional clutch 16 moves to the right, it can close with the fixed fluted disc on the fifth gear 14, the power source 1 transmits power to the vehicle axle half shaft via successively the input shaft 3, the first gear 4, the idle gear 5, the second gear 6, the intermediate shaft 8, the sixth gear 7, the fifth gear 14, the bidirectional clutch 16 and the output shaft 12, and the engagement transmission ratio in the automatic transmission 2 is i1×i2. That is the first operating condition.

When the bidirectional clutch 16 moves to the left, it can close with the fixed fluted disc on the fourth gear 11, the power source 1 transmits power to the vehicle axle half shaft via successively the input shaft 3, the first gear 4, the idle gear 5, the second gear 6, the intermediate shaft 8, the third gear 10, the fourth gear 11, the bidirectional clutch 16 and the output shaft 12, and the engagement transmission ratio in the automatic transmission 2 is i1×i3. That is the second operating condition.

When the bidirectional clutch 16 is in the middle to open both of the fifth gear 14 and the fourth gear 11, neutral position is realized, and at this point no power is outputted to the vehicle axle half shaft.

The gear shifting sequence of the driving unit on the right is the same as that of the driving unit on the left.

The other contents of the sixth embodiment of the present disclosure are the same as those of the first embodiment, and will not be described repeatedly here.

The above are only special embodiments of the present disclosure. By the teaching of the present disclosure, a person skilled in the art can make other modifications or variations on the basis of the above embodiments. A person skilled in the art should appreciate that, the above special descriptions are only for the purpose of better explaining the present disclosure, and the protection scope of the present disclosure should be subject to the protection scope of the claims.

What is claimed is:

1. A vehicle two-power-source dual driving assembly, wherein, the vehicle two-power-source dual driving assembly comprises two sets of driving units that are symmetrically arranged, the two sets of driving units connect to a same set of vehicle axle half shafts and have a same gear shifting sequence, each of the sets of driving units is provided with a power source and an automatic transmission, and the power source and the automatic transmission are an integrated structure;
the two automatic transmissions are symmetrically arranged in two separated boxes, and there is no connection between the two automatic transmissions;
each of the automatic transmissions is connected to one of the vehicle axle half shafts, and each automatic transmission has two mutually switchable speed ratios;
wherein each of the automatic transmissions is provided therein with an input shaft, an intermediate shaft and an output shaft that are parallel,
the input shaft is connected to the power source in the same set of driving unit, the output shaft is connected to a left half shaft or right half shaft of the vehicle axle half shaft;
the input shaft is connected to the intermediate shaft via a first gear train;
a second gear train and a third gear train that have different transmission ratios are provided between the intermediate shaft and the output shaft, and the intermediate shaft and/or the output shaft are/is provided thereon with a clutch for switching between the second gear train and the third gear train.

2. The dual-power-source dual driving assembly for a vehicle according to claim 1, wherein the first gear train comprises a first gear provided on the input shaft and a second gear provided on the intermediate shaft, and the first gear and the second gear are engaged; or an idle gear is provided between the first gear and the second gear.

3. The dual-power-source dual driving assembly for a vehicle according to claim 1, wherein the second gear train comprises a third gear provided on the intermediate shaft and a fourth gear that is provided on the output shaft and is engaged with the third gear, the third gear is idle-nested to the intermediate shaft and is connected to the clutch, or the fourth gear is idle-nested to the output shaft and is connected to the clutch.

4. The dual-power-source dual driving assembly for a vehicle according to claim 1, wherein the third gear train comprises a fifth gear provided on the output shaft and a sixth gear that is provided on the intermediate shaft and is engaged with the fifth gear, and the fifth gear is idle-nested to the output shaft and is connected to the clutch, or the sixth gear is idle-nested to the intermediate shaft and is connected to the clutch.

5. The dual-power-source dual driving assembly for a vehicle according to claim 1, wherein the clutch comprises a first-gear clutch and a second-gear clutch, the first-gear clutch is provided on the output shaft or the intermediate shaft and is configured to be connected to the third gear train, and the second-gear clutch is provided on the intermediate shaft or the output shaft and is configured to be connected to the second gear train.

6. The vehicle two-power-source dual driving assembly according to claim 5, wherein the first-gear clutch and the second-gear clutch are contrate tooth clutches comprising a movable fluted disc and a fixed fluted disc.

7. The vehicle two-power-source dual driving assembly according to claim 5, wherein the first-gear clutch and the second-gear clutch are both wet clutches, the wet clutches are provided therein with dual friction plates and steel plates, and the dual friction plates and the steel plates contact or separate by hydraulic oil driving to realize clutching.

8. The dual-power-source dual driving assembly for a vehicle according to claim 1, wherein the clutch the clutch is a bidirectional clutch that is nested to the intermediate shaft or the output shaft, and the bidirectional clutch slides in an axial direction to be connected to the third gear train or the second gear train.

9. The vehicle two-power-source dual driving assembly according to claim 1, wherein a transmission ratio of the first gear train is i1, a transmission ratio of the third gear train is i2, a transmission ratio of the second gear train is i3, and an engagement transmission ratio in the automatic transmission is i1×i2 or i1×i3.

* * * * *